Jan. 24, 1967  D. J. BYERS  3,299,769
METHOD AND MEANS FOR ASCERTAINING VISIBILITY CONDITIONS
Filed March 8, 1963
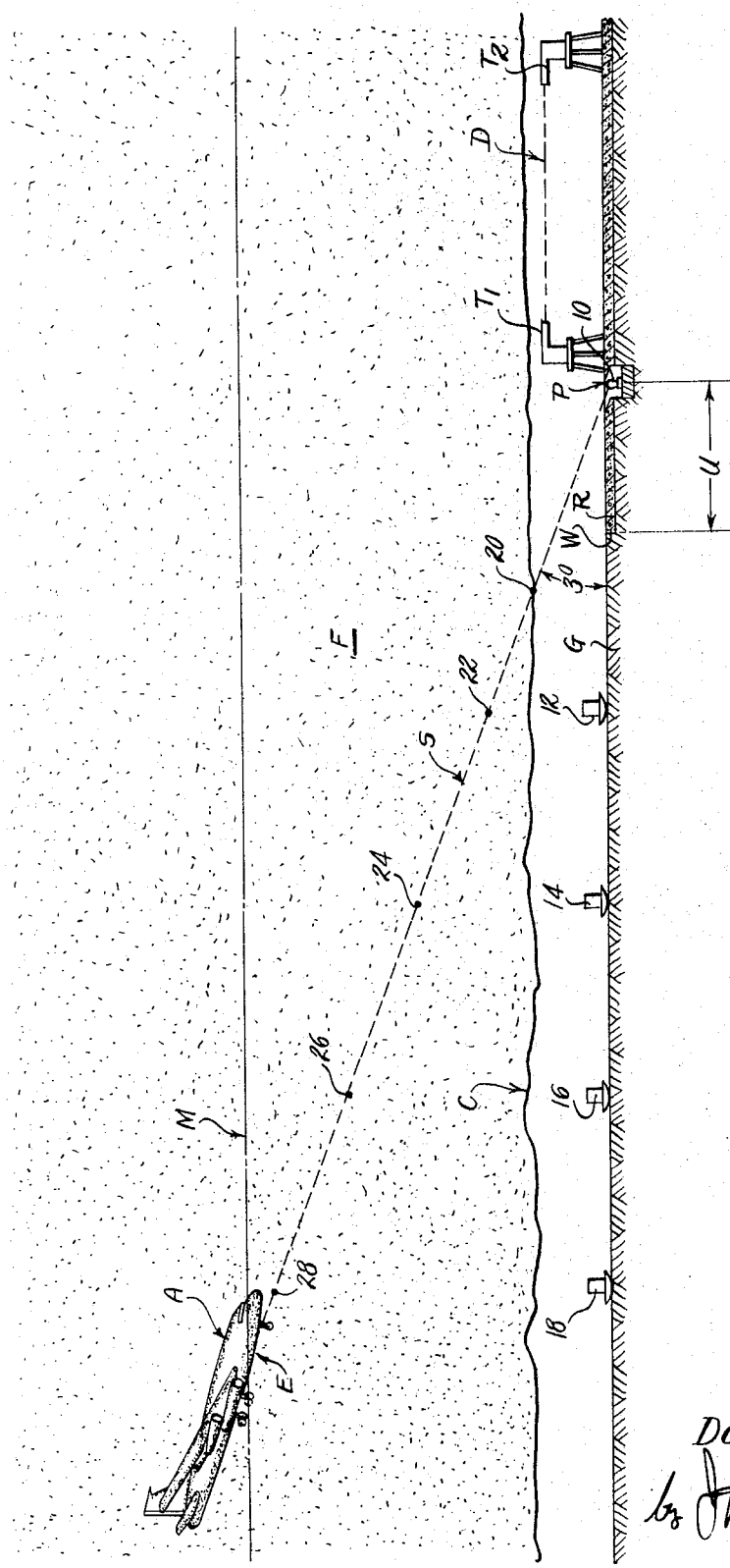
INVENTOR.
Donald J. Byers

United States Patent Office 3,299,769
Patented Jan. 24, 1967

3,299,769
METHOD AND MEANS FOR ASCERTAINING VISIBILITY CONDITIONS
Donald J. Byers, Falls Church, Va.
(9517 St. Charles Place, Fairfax, Va. 22030)
Filed Mar. 8, 1963, Ser. No. 263,775
2 Claims. (Cl. 88—14)

The present invention relates to means and methods for determining local landing visibility at airports for the information of aircraft pilots approaching same.

Objects of the present invention comprise in general the observation of visibility conditions at airport areas during poor weather conditions. A concurrent object of the present invention is the rendering of reports as to visibility conditions for a guidance of the pilot and which enable him to make a decision whether or not to accomplish a landing operation on a given field. It is also an object of the present invention to provide the pilot of an aircraft with the necessary information that will advise him, in advance of the time that he reaches a minimum altitude, as to the visibility conditions at the point of completion of his descent. A further object of the present invention is the securing of better and more specific information as to visibility conditions within the critical portion of the glide path of a descending aircraft namely that portion which extends from the point where the glide path intersects the plane of minimum altitude level, to touchdown point on the runway.

A further object of the present invention involves the provision of novel means and method for measuring light transmission through the aforesaid portion of the glide path.

It is a further object of the present invention to take readings at one or more points along the aforesaid portion of the aircraft's glide path.

In making a landing on a given field the visibility of the area in the vicinity of the point of touchdown is an indispensable factor in the present state of the art. Under federal regulations it is prescribed that a pilot approaching for a landing must be able to see the ground from the point where he enters the prescribed minimum altitude. If at that altitude the pilot is unable to see the ground he is required to pull out of his line of descent and remain aloft pending clearance or take departure to another landing site.

During adverse weather conditions and during the prevalence of fog, smog, low lying clouds, the pilot of the airborne plane is in need of reliable information as to visibility at the site of landing while he is still a considerable distance therefrom. At present, such information is provided by reports furnished by the United States Weather Bureau and the Federal Aviation Agency.

However, the information that is available in these reports is limited to conditions imposed on the observers and the equipment provided for their operations. These reports reflect information secured as to visibility along the ground in the general area as observed from the field towers, or as observed along the runway. Not infrequently it happens that visibility is above minimum in the area of observation and the pilot, basing his navigation on this favorable report, aligns his plane on the glide slope for an instrument landing. Proceeding down the line of slope, he will reach the minimum altitude that is prescribed in the federal regulations. At this point his decision to continue his descent is predicated on his ability to see the field. Since, however, the visibility reading has not been taken in this critical area, where the glide slope descends below the minimum altitude, it not infrequently occurs that the pilot, despite prior favorable visibility information, is compelled for reasons of restricted visibility down the glide slope to pull out of his descent and await further clearance or proceed to another point of landing. Such abortive deferences involve very considerable loss of time, undesirable high consumption of fuel, and place a psychological strain both on pilot and passengers which can derogate considerations of safety.

As will be understood, these difficulties arise as a result of the variances in visibility conditions, which may be quite great, even within so small an area as that of the final portion of the glide path itself. Manifestly, costly mistakes could be avoided, and the efficiency and safety of flight under conditions of restricted visibility improved, if readings of specific conditions could be secured within the critical area, and transmitted to the pilot before he reaches that area.

According to the present invention visibility may be determined by readings indirectly taken from a beam of radiant energy directed in the upward direction along or approximately parallel to the glide slope. As this beam so directed traverses its predetermined path it will be attenuated to a degree dependent upon the density of the intervening obscuring material in the atmosphere. To simplify discussion it may be assumed that the obscuring agency is fog, consisting of a suspension of minute water particles. In this view the density of the fog may be considered as a function of the number of particles per unit volume of air.

The directing source of the beam of radiant energy may well be located at the approximate touchdown point on the runway. The beamed energy may be any suitable radiation within the electromagnetic specturum such as infra-red, ultra-violet, ordinary white light or high intensity light from lasers. In general it will be preferred to employ radiant energy of shorter wave length for reasons hereinafter appearing.

Moreover, the beam of energy should preferably have an intensity as to penetrate the densest fog, at least as far as the farthest sensor as hereinafter described. As the beam of energy passes through the fog the energy will be absorbed and reradiated from the fog particles by the process termed scattering or diffusion. Moreover, the intensity of the diffused or reradiated energy will be inversely proportional to the density of the fog through the beam path up to the point of observation of the reradiated energy. As will be understood, the shorter wave lengths will be more greatly transformed into reradiation energy than the longer and more penetrating wave lengths.

The attenuation of the energy of the directed beam of a given portion of its length may be measured by various means. For this purpose suitable energy sensors may be located at points of observation set off from the beam in order to receive only the reradiated energy. Suitable energy sensors for example may be located directly under the beam, or they may be spaced laterally, in any event being so oriented as to receive reradiated energy from the energized fog particles and emanating in a direction angular with respect to the direction of the beam. Thus the sensors may be located in the surface of the runway or in the field constituting an extension of the plane of the runway. The sensors should be directionally oriented, for instance, to receive reradiated energy at an angle to the beam which angle may approach 90 degrees. Some of the energy reradiated from the suspended fog particles will be radiated in a vertical direction and may be received by sensors adjusted to an angle of somewhat less than 90 degrees from the beam. The essential consideration is that the amount of observed reradiated energy is a function of the attenuation of the primary beam and indicates the obscuring power or density of moisture droplets. Visibility may for convenience be expressed in suitable amounts such as thousands of feet or fractions of a mile. The readings obtained may be transmitted directly to instruments in the control towers or to a readout instrument provided in the cockpit of the aircraft itself, by suitable signals. These signals may be superimposed on existing airport radio equipment transmissions such as the glide slope localizer.

The readings of reradiated energy which in turn signify the attenuation of the energy beam may be secured by readings taken in various ways; preferably, by a plurality of sensors located at suitable spaced points with reference to the source beam. Given clear or relatively clear visibility conditions along a certain space transferred by the beam, the difference in readings of reradiated energy at separated points along said beam would be negligible or substantially zero. On the other hand in a heavy fog, the amount of reradiated energy received by the sensor closest to the source point of the beam, would be greater than the amount of reradiated energy located at a more distant point along the beam. The sensors may be located at, or slightly below, or mounted on a ground supported base. The term "substantially at ground level" is inclusive in this respect.

Referring now to the figure of drawing, this schematically represents certain conditions confronting a pilot at a critical time when he has entered the minimum altitude during an approach to the landing field. For purposes of illustration the scale of proportions in the drawing has been modified in some respects.

In the figure of drawing the aircraft A is descending toward the field G along glide slope S, which slope normally may be about 3 degrees from horizontal and is exaggerated in the drawing. Minimum altitude is indicated by broken line M and this may be taken as representing 200 feet above ground level. Obscuring factor is fog F. The visibility ceiling is indicated by irregular line C.

Aircraft A is shown at the instant of penetration of minimum altitude M. The pilot had previously elected to come down, basing his decision on a report of good ground visibility. However, this report is based on observation from location of photo-electric visibility measuring towers $T_1$ and $T_2$. At this area of observation, which normally will be remote from the touchdown point, line of sight D would indicate absence of fog. Although this observation would be locally correct, at point E the aircraft is enveloped in fog and the pilot would be unable to see the runway area R. Accordingly, despite report of clear conditions the pilot, according to regulations and good safety practice, is compelled to reverse his direction of descent and climb above minimum altitude and then circle a navigational fix to await further instructions. He now has the alternative of remaining aloft to await clearance, in this, however, quite possibly risking another abortive attempt, or he can proceed to another airport. The result in either event is not only disruptive of flying schedules but is very considerably wasteful of time and fuel and creates a certain amount of psychological pressure on the pilot and passengers. The pilot, being informed that there is acceptable (or above-minimum) visibility at ground level, may decide to take a chance that he will break out momentarily after descending through minimum altitude, and continue his descent, with fatal consequences as a result of miscalculation.

It will be understood that the visibility conditions shown in the figure of drawing are merely representative and that visibility may be other than as shown in the drawing. For example, the fog may not always vary in density in a vertical direction but the photo-electric visibility measurement towers, for example, may be in a very clear area laterally separated from the area in which the plane is flying during descent by a considerable distance.

According to the present invention and as illustrated in the drawing a beam of radiant energy generated by suitable source 10 is directed upward along line S. As the beam continues from source 10 to point 20 it traverses clear atmosphere with substantially no diminution of the beam. From point 20 upward along line S however, it passes through the relative opacity of fog F and is progressively attenuated. Furthermore, this attenuation is coincident with a diffusion effect. Thus, at point 22 the suspended fog particles radiate out diffused light in every direction, and the downward vertical component of this diffused energy may be received by directionally oriented sensor 12. Likewise at point 24, the diffused energy is similarly radiated and is registered by sensor 14 which is oriented to receive from the vertical direction preferentially.

It now may be understood that due to the attenuation of the beam of exciting energy in its passage from point 22 to point 24, the reradiation received by sensor 14 will be measurably less than that received by sensor 12, and further that the thus observed differences in energy received at the two sensors will be in general proportional to the attenuation along the beam and to the inervening fog density. By arranging sensors 12, 14, 16 and 18 in the manner shown in the drawing, it will be evident that readings corresponding to visibility, i.e., to fog density, may be taken at a plurality of sections along the glide slope S. At the same time even one sensor located as illustrated will provide a certain degree of useful information, and may be employed to measure the density of the fog in which case the intensity of radiation from the initiating source should be of a fixed and known magnitude. Likewise, it will be understood that although in the drawing it would appear that the sensors are located in a line formed by the intersection of a vertical plane containing line S with the ground surface, it will be apparent that the sensors need not all lie in the same vertical plane but may be laterally disposed as to said plane. In the drawing it has not been attempted to maintain the true ratio of all of the distances involved. Thus, the distance U taken from point P to threshold W may be 2,000 feet and the distance between the towers $T_1$ and $T_2$ taken along line D may be 500 feet.

Having now described a preferred embodiment of the invention, what is claimed and desired to be protected by Letters Patent is set forth in the following claims:

1. Method for measuring atmospheric visibility conditions for the information of airborne aircraft prior to touchdown, comprising projecting a directed beam of radiant energy through the space extending substantially from the intersection of the glide slope of said aircraft with the minimum altitude level to the point of touchdown, and taking a series of observations, of several points progressively spaced along said slope within said space, of the scattered reradiated energy from said beam, passing through said space, said observations being taken at an angle to the direction of said beam.

2. Method for measuring atmospheric visibility conditions for the information of airborne aircraft prior to touchdown, comprising projecting a directed beam of radiant energy through the space extending substantially from the intersection of the glide slope of said aircraft with the minimum altitude level to the point of touchdown, and taking a series of observations at intervals with respect to, and within said space and from points laterally removed from said beam, of the scattered reradiant energy from said beam, passing through said space, said observations being taken at an angle to the direction of said beam, substantially at ground level.

References Cited by the Examiner

UNITED STATES PATENTS

| | | | |
|---|---|---|---|
| 2,682,798 | 7/1954 | Schock. | |
| 2,907,889 | 10/1959 | Nichols et al. | 250—236 |
| 3,013,855 | 12/1961 | Lapinski et al. | |
| 3,146,293 | 8/1964 | Lesage | 250—218 |

FOREIGN PATENTS 794,472  5/1958  Great Britain.

OTHER REFERENCES

Horman, H. M.: "Measurement of Atmospheric Transmissivity Using Backscattered Light From a Pulsed Light Beam," Journal of the Optical Society of America, vol. 51, No. 6, June 1961, pp. 681–691.

JEWELL H. PEDERSEN, *Primary Examiner.*

O. B. CHEW, *Assistant Examiner.*